UNITED STATES PATENT OFFICE.

FREDERICK EVANS, OF NEW YORK, N. Y.

IMPROVEMENT IN TREATING DAMAGED COFFEE.

Specification forming part of Letters Patent No. 134,792, dated January 14, 1873.

*To all whom it may concern:*

Be it known that I, FREDERICK EVANS, of the city, county, and State of New York, have invented a new and Improved Process for Restoring Coffee; and that the following is a full, clear, and exact description of the same.

The object of this invention is to improve and make marketable damaged and discolored and other coffee-beans; and the invention consists in first making a solution of sulphuric acid and water to the density of 10.50° Baumé. This solution is allowed to cool, the damaged coffee placed in it, and agitated until the discolorations and impurities on the beans are removed. The coffee is then removed from the acid solution and washed in pure water, and dried by artificial heat, and it will be found that after this process the beans are thoroughly cleansed and restored to their natural color, besides being otherwise improved in appearance, such as being fuller.

By this process, blackened and damaged coffee that before had little or no sale is rendered marketable. But this process is not alone applicable to damaged and discolored coffees, but all coffees, whether damaged or not, are improved.

Having thus described my invention, what I claim as new, and desire to secure by Letters Patent, is—

The process, hereinbefore described, of restoring damaged and discolored coffee-beans.

FREDERICK EVANS.

Witnesses:
 W. L. WATTENBERG,
 G. M. PLYMTON.